May 10, 1966  F. HILTON ETAL  3,250,012
INSPECTION DEVICE AND METHOD
Filed Feb. 1, 1963  4 Sheets-Sheet 2
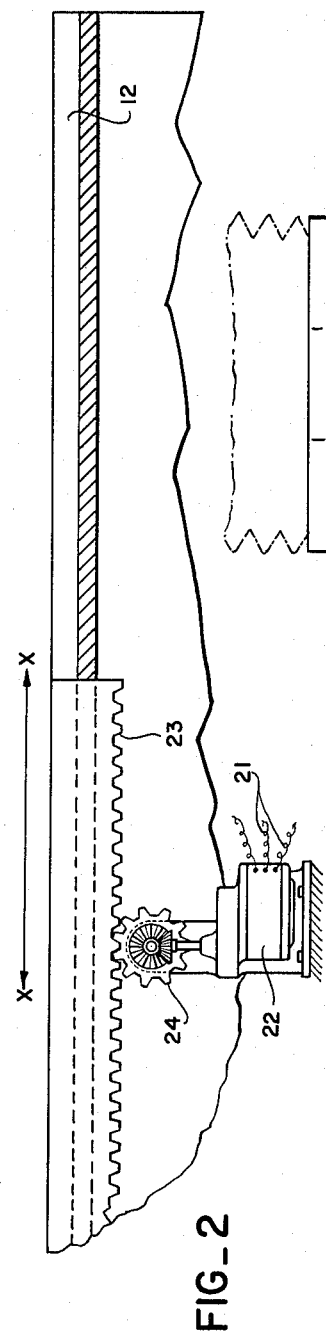
FIG._2
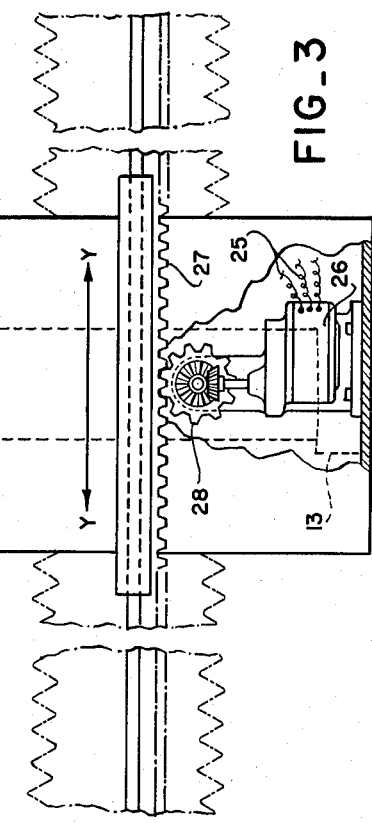
FIG._3
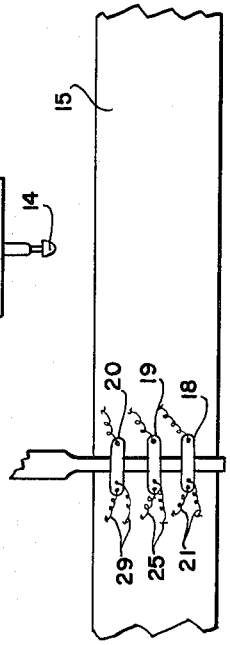
FIG._5
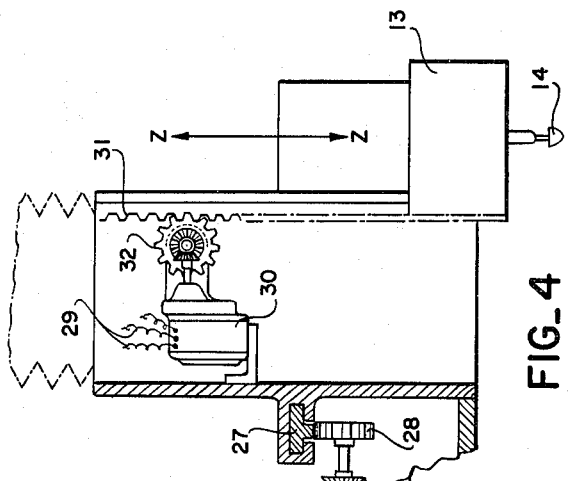
FIG._4
INVENTORS
FOSTER HILTON
JEAN D. HANSEN
DOUGLAS H. JENNINGS
By George C. Sullivan
Agent

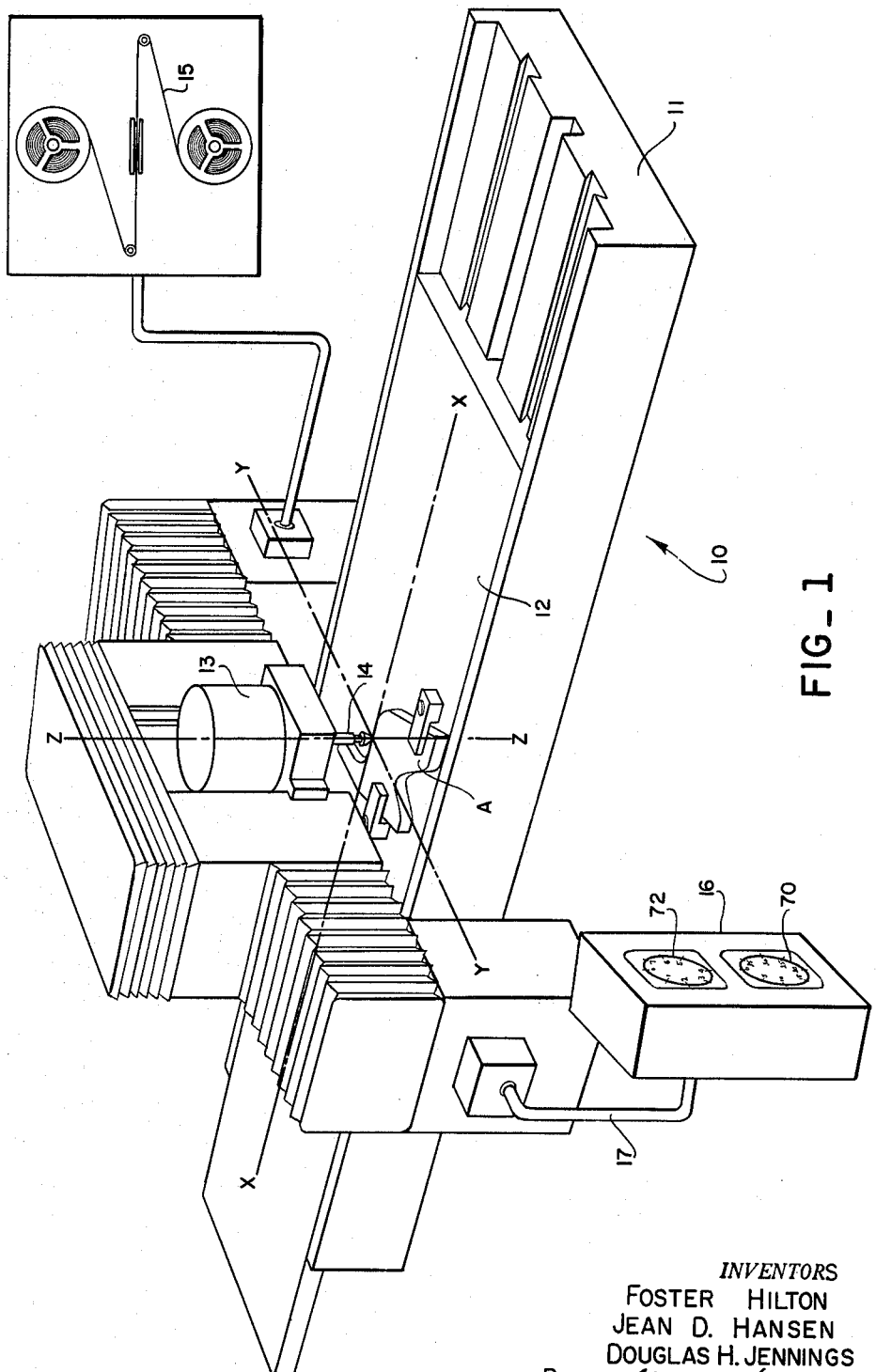

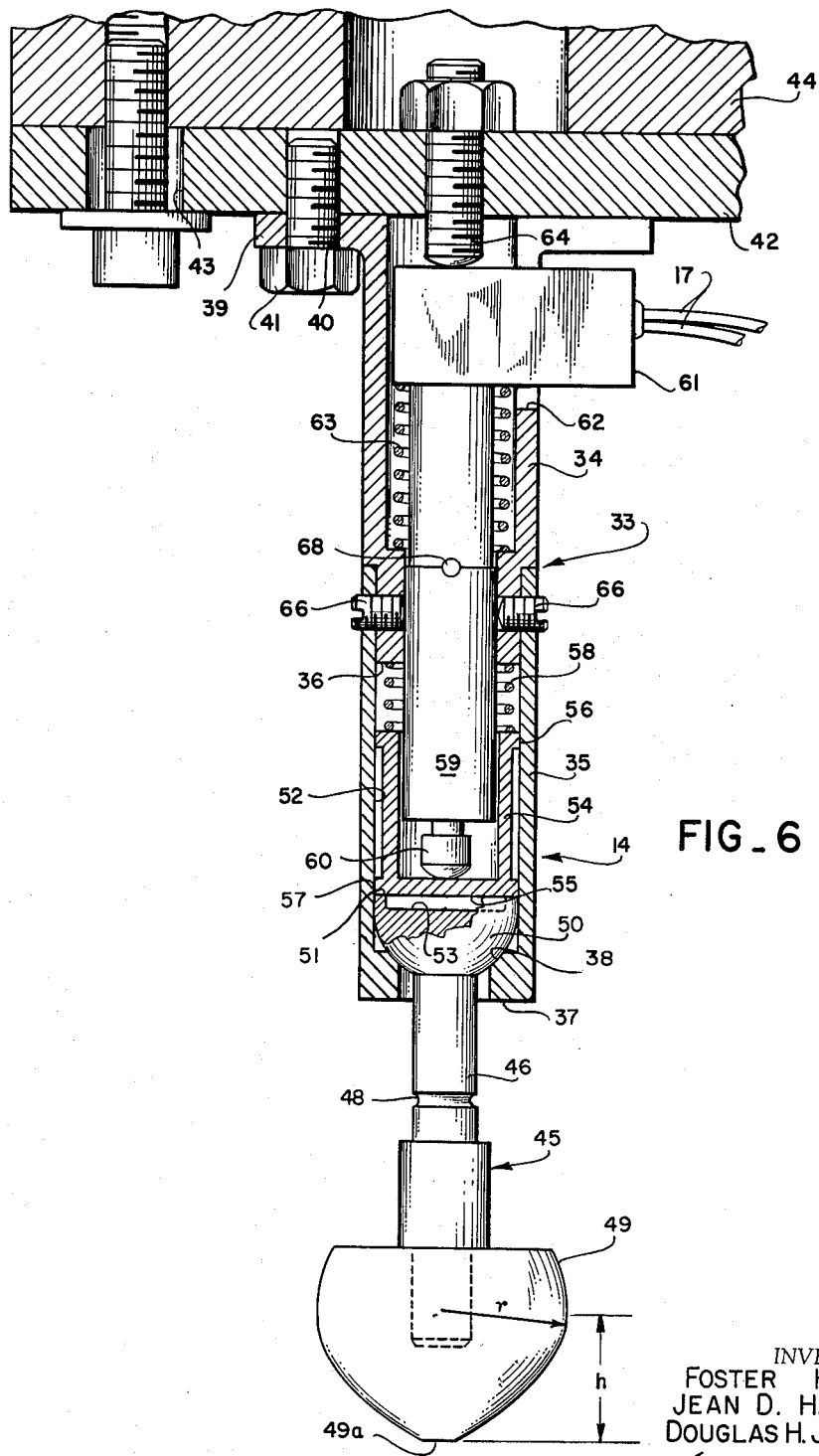
FIG_6

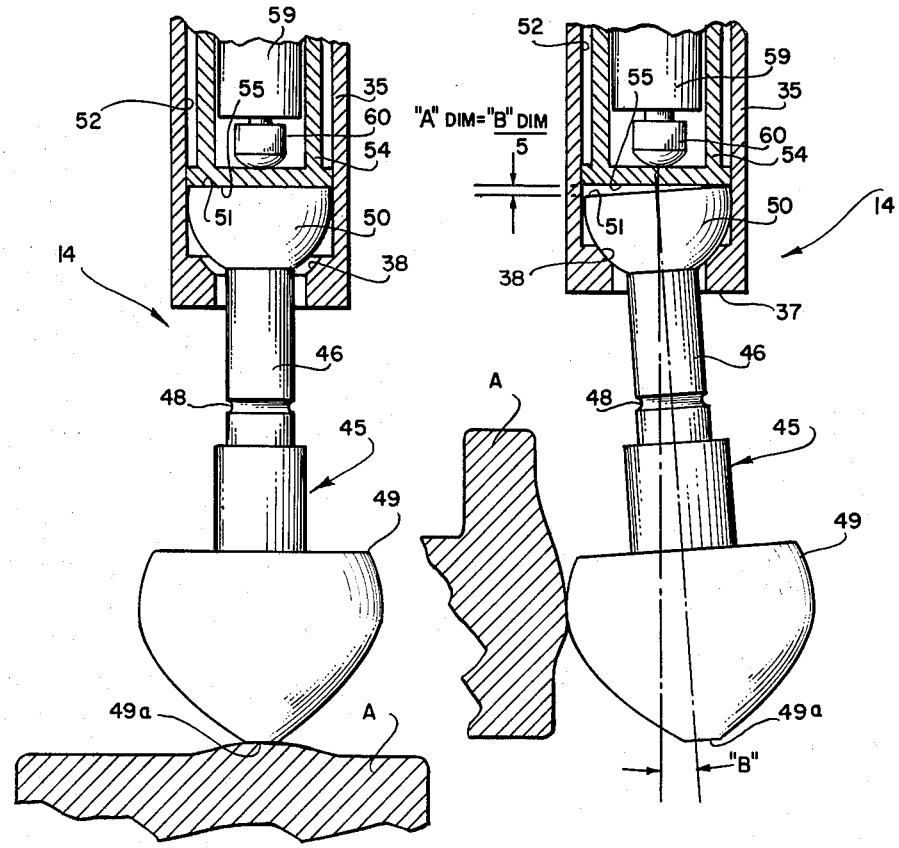
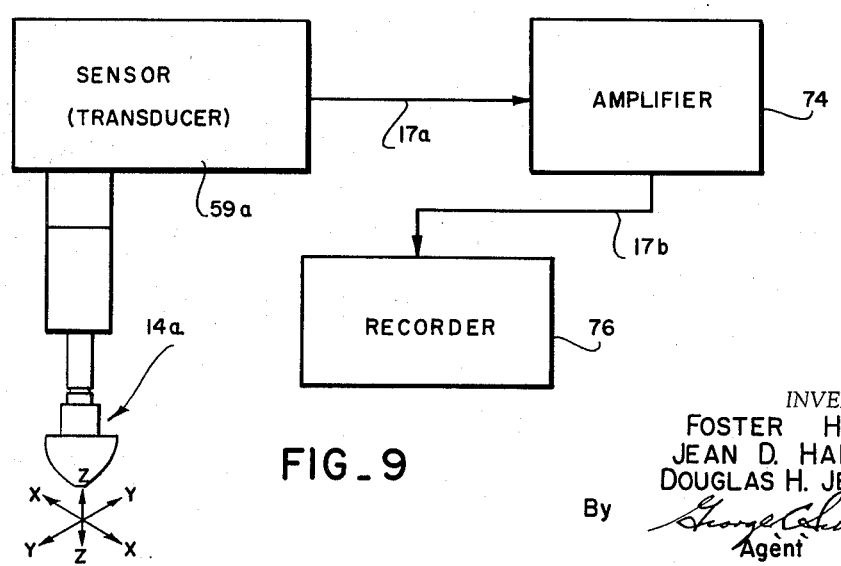

United States Patent Office 3,250,012
Patented May 10, 1966

3,250,012
INSPECTION DEVICE AND METHOD
Foster Hilton, Sherman Oaks, Jean D. Hansen, Sun Valley, and Douglas H. Jennings, Burbank, Calif., assignors to Lockheed Aircraft Corporation, Burbank, Calif.
Filed Feb. 1, 1963, Ser. No. 255,533
2 Claims. (Cl. 33—174)

The present invention relates to an inspection device and method and more particuarly to an apparatus for and a method of inspecting machined parts with a numerically controlled machine which measures deviations of inspection points from predetermined nominal dimensions along X, Y or Z axes in accordance with a predetermined, taped program.

It has long been a problem to efficiently and expeditiously inspect certain machined parts using conventional surface plate methods. The parts must be inspected in all planes and large parts must be inspected with deep throated micrometers, indicators and other devices having special extensions which often require two men to manipulate. Such a method of inspection is not only very time consuming, but also leaves no permanent record of the points inspected.

With the apparatus and method of the present invention, on the other hand, an inspection tape is employed to control a machine which automatically measures and records tolerance deviations from nominal dimensions of machined surfaces. The numerically controlled machine may be a separate device, but will preferably be the machine which originally machined the parts to be inspected to that they may be inspected before removing them from the machine thereby eliminating the excessive time required with surface plate set-ups and measurements. Parts which were formerly inspected using conventional surface plate methods requiring 24 hours to complete the inspection may be inspected in 15 minutes with the apparatus and method of the present invention. Also, the machine operator may make the inspection cycle without an inspector being present because in one embodiment of the present invention, a permanent record is made of tolerance deviations which an inspector may check at his convenience.

In view of the foregoing conditions and factors characteristic of devices and methods for inspecting machined parts, it is a primary object of the present invention to provide a new and improved apparatus and method not subject to the disadvantages enumerated above and having a numerically controlled inspection device especially designed for inspecting a given part and leaving a permanent record of the inspection efficiently, expeditiously and economically.

Another object of the invention is to provide an inspection device and method employing a numerically controlled machine to inspect parts produced by the machine.

Yet another object of the invention is to provide an improved method for inspecting machined parts.

A further object of the invention is to provide an inspection device which may be mounted in the spindle of a numerically controlled machine programmed with an inspection tape to probe a machined product with a predetermined preload for nominal dimensions of machined surfaces and which indicate deviations therefrom.

A still further object of the present invention is to provide an apparatus and method for the high speed inspection of machined parts on tape controlled machines wherein an inspection probe will be automatically driven to predetermined inspection points and will transmit a signal to an indicator which will reflect the magnitude of the signal as a measure of deviations from nominal locations along X, Y and Z axes.

Another object of the invention is to provide an inspection probe for the spindle of a tape controlled milling machine which will (1) probe a part being inspected in accordance with a predetermined program, (2) sense out-of-tolerance dimensions and (3) send a signal to a recording instrument.

According to the present invention, a part to be inspected is set-up on the table of a numerically controlled machine which may be the machine which produced the part or a special machine provided for the inspection operation. An inspection probe is then mounted in the spindle of the machine and an inspection tape is employed to drive the table and the spindle in accordance with a predetermined program in such a manner that the probe will contact the machined part at predetermined points.

The probe includes a spherical contact element having a radius and a height which are programmed into the inspection tape in such a manner that the contact will touch the machined part at a point to be measured with a predetermined preload for a nominal dimension of the part which will deflect the contact element a given amount. An under-tolerance deviation of the part from the nominal dimension will decrease the deflection of the contact element and an over-tolerance deviation will increase the deflection. This deflection is transmitted to a sensing mechanism, such as an electromechanical transducer, which translates it into a signal having a magnitude proportional to the deviation of the probed point from its nominal dimension. The sensing mechanism is adjusted in such a manner that the given amount of deflection of the contact element results in a signal falling at the middle of the range of the sensing mechanism so that the relative magnitude of the signal will lie in a negative direction for a decreased deflection and in a positive direction for an increased deflection. Means are also provided for converting this signal into a dimensional reading.

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which:

FIGURE 1 is a perspective view, showing somewhat schematically, the general arrangement of the inspection device of the invention;

FIGURE 2 is a schematic view of a rack and pinion means which may be employed to drive a first component of the device of FIGURE 1;

FIGURE 3 is a schematic view of a rack and pinion means which may be employed to drive a second component of the device of FIGURE 1;

FIGURE 4 is a schematic view of a rack and pinion means which may be employed to drive a third component of the device of FIGURE 1;

FIGURE 5 is a schematic view of a magnetic tape and associate pick-up heads which may be employed to control the operation of the rack and pinion means shown in FIGURES 2–4;

FIGURE 6 is an elevational view, partly in cross section, of a probe assembly for an inspection device of the invention;

FIGURE 7 is a view similar to FIGURE 6 showing the associated parts in a first operating position;

FIGURE 8 is a view similar to FIGURE 6 showing the associated parts in a second operating position; and FIGURE 9 is a block diagram schematically showing an inspection device of the invention in a second operating environment.

Referring again to the drawings and particularly to FIGURES 1-5, an inspection device constituting the present invention, generally designated 10, includes a numerically controlled machine 11 having a movable table 12 and a movable spindle 13. A probing element 14 is mounted in the spindle 13 and is adapted to contact a machined part A at predetermined points to be inspected when a programmed inspection tape 15 drives the table 12 along an X axis and moves the spindle 13 non-rotatably along Y and Z axes in accordance with a predetermined program. The probing element 14, through means to be hereinafter described, senses the part A at each predetermined point for a nominal dimension and transmits a signal to an indicating gage 16 through a conduit 17. The gage 16 indicates any deviation from the nominal dimension. The tape 15 is sensed by three magnetic pickup heads 18, 19 and 20 (FIGURE 5). The head 18 may be connected through leads 21 to an electric motor 22 which reversibly drives table 12 along the X axis of machine 11 through a rack 23 and a pinion 24 in accordance with a predetermined program set into the tape 15. The head 19 may be connected through leads 25 to an electric motor 26 which reversibly drives spindle 13 through a rack 27 and a pinion 28 along the Y axis of the machine 11 in accordance with the program set into tape 15. The head 20 may be connected through leads 29 to an electric motor 30 which reversibly drives spindle 13 along the Z axis of the machine 11 through a rack 31 and a pinion 32 in accordance with the program set into tape 15.

Referring now to FIGURES 6-8, the probing element 14 comprises a cylindrical body portion 33 having an upper member 34 and a lower member 35. The lower member 35 has an open top adapted to telescopically engage an off-set neck portion 36 constituting the lower end of the upper member 34. The bottom of the lower member 35 includes an inturned, annular flange 37 having a sloping annular land 38. The upper member 34 carries a flange 39 having bolt receiving apertures 40 through which bolts 41 pass and secure the probing element 14 to a plate 42. The plate 42 contains oversized bolt holes 43 so that the plate 42 may be attached to an arbor 44 and then adjusted to assure that the center line of the probing element 14 corresponds with the center line of the spindle 13. The arbor 44 is adapted to engage a chuck, not shown, in the spindle 13 and mount the probing element 14 on the machine 11.

The part A is contacted with a contact assembly 45 which includes a contact spindle 46 having a reduced neck portion 48, a preferably spherical contact 49 and an upper hemispherical member 50. The member 50 seats on the land 38 and has an upper face 51 which is machined and lapped to form a true 90° angle with respect to the center line of contact spindle 46 and an inner wall 52 of the lower member 35. The upper face 51 also includes an annular dirt collecting recess 53 to receive any foreign matter that might otherwise lodge between the face 51 and its mating part, to be hereinafter described. The reduced neck portion 48 is provided to assure that the spindle 46 will snap before the remaining portions of the probing element 14 are damaged if the probing element over-rides a part being inspected. The spherical contact 49 is adapted to contact the product being measured and probe it along X, Y or Z axes. While the configuration and dimensions of the contact 49 and the length of spindle 46 are dictated by the configuration and size of the product to be measured, they are shown for purposes of illustration, but not of limitation, as being dimensioned in such a manner that there is a five-to-one difference when reading horizontal dimensions as against vertical dimensions. In the preferred embodiment, the radius $r$ and the height $h$ of the illustrated contact 49 are identical and are proportioned to the length of spindle 46 in such a manner that they may be, for example, programmed into tape 15 at minus 0.010 inch for horizontal deflection and minus 0.002 inch for vertical deflection. In some instances it is desirable that the lower extremity of contact 49 be of frustro-conical configuration, such as illustrated in FIGURE 8, the tip 49a being parallel to face 51. Obviously, other shapes may also be utilized for specific applications.

A precision machined piston 54 is slidably mounted in the lower member 35 superjacent the member 50 and includes a lower face 55 having a lapped-in fit with the upper face 51 of member 50. The piston 54 includes upper and lower annular shoulders 56 and 57, respectively, each having a lapped-in fit with the inner wall 52 of the lower member 35 so that a true 90° angle is maintained between the face 55 and the inner wall 52. A compression spring 58 is mounted in the member 35 with one end bearing against the piston 54 and its other end bearing against the reduced neck 36 to bias the piston 54 into firm contact with the member 50. Displacement of the contact 49 in any direction will cause an upward displacement of the piston 54 by either rocking the member 50 on seat 38, as shown in FIGURE 7, or by a direct vertical movement of the member 50, as shown in FIGURE 8. This displacement is sensed by a transducer 59 which may be any suitable linear displacement measuring transducer such as a model AA-1-6 Airprobe manufactured by Federal Products Corporation, Providence 1, Rhode Island. The transducer 59 is mounted in the body portion 33 of probing element 14 with its probe 60 engaging the upper side of piston face 55 and includes a right angle mounting adaptor 61 which extends through a slot 62 in the sidewall of the upper member 34. A compression spring 63 biases the transducer 59 into engagement with an adjusting screw 64 which is employed to adjust the transducer to its operating range. Set screws 66 may be tightened against the transducer 59 to retain it in a fixed position. The transducer 59 is adjusted to the center of its working range with the piston 54 displaced upwardly a given amount. The probing element 14 probes a part to be inspected with a preload so that the piston 54 will be displaced said given amount when contact 49 dwells on a point having a nominal dimension. Then when the contact 49 probes a point having an under-tolerance dimension, the piston 54 will be displaced less than the given amount causing the transducer 59 to respond on what might be termed the "negative" side of the center of its working range and when the contact 49 probes a point having an over-tolerance dimension, the piston 54 will be displaced more than the given amount causing the transducer 59 to respond on what might be termed the "positive" side of the center of its working range. The amplitude of the signal emitted by transducer 59 can then be scaled from a negative reading for under-tolerance dimensions through a zero point for nominal dimensions to a positive reading for over-tolerance dimensions. The transducer 59 includes a vent 68 and is connected to the indicator 16 by attaching conduit 17 to adaptor 61.

Since, in its preferred embodiment, the probing element 14 is designed so that there is a five-to-one difference between horizontal and vertical displacements, the indicator 16 (FIGURE 1) may include a first dial 70 displaying the amplitude of signals received due to a horizontal displacement and a second dial 72 displaying the amplitude of signals received due to a vertical displacement. Of course it is to be understood that the dials 70 and 72 will each be calibrated in such a manner that the deviation of the part A from its nominal dimensions will be shown on the dials in fractions or decimals of an inch.

Referring now to FIGURE 9, the inspection device of the invention may be employed in a second operating environment wherein all parts of the device may be identical to those shown in FIGURES 1-8 except that the transducer 59, indicator 16 and conduit 17 are replaced with an electronic system which also records out-of-tolerance dimensions by providing a probing element 14a having a transducer 59a which transmits an electrical signal through a first conduit 17a to an amplifier 74 which, in turn, amplifies the signal and transmits it through a second conduit 17b to a recording head 76 which records signals received on a suitable chart, not shown.

Operation of the apparatus of the invention will be described in connection with the embodiment shown in FIGURES 1–8. Assuming that the machine 11 constitutes a numerically controlled milling machine which has just completed milling operations on the part A, then the element 14 is attached to the spindle 13 in place of the regular cutter and the machine 11 is operated by the inspection tape 15 which moves the table 12 and the spindle 13, without rotating the spindle. In accordance with a predetermined program the contact 49 will touch the milled part A at predetermined points with sufficient force to deflect the contact 49 a given amount if the points have nominal dimensions. The contact 49 will dwell for a predetermined time period, for example, 5 seconds at each measuring point and will reflect a zero reading on both dials on indicator 16 if the point being inspected has its required dimension. If, on the other hand, the point being measured is out of tolerance in a positive direction along a horizontal plane, the contact 49 will be deflected more than its given amount causing the piston 54 to be displaced upwardly by an additional amount which is proportional to the deflection. Upward displacement of the piston 54 by this additional amount causes a linear displacement of probe 60 past the center of its working range in a positive direction, thereby transmitting a signal to indicator 16 which displays the amplitude of the signal on dial 70 in terms of fractions of an inch in a plus direction. Should the point being measured be out of tolerance in a negative direction, contact 49 will deflect less than its given amount resulting in insufficient displacement of probe 60 to bring it to the center of its working range and a negative reading will be displayed on dial 70. Of course it is apparent that, should the point being measured be in a vertical plane and be out-of-tolerance in a vertical direction, the contact 49 will not deflect, but will move the piston directly upwardly causing the amplitude of linear displacement of probe 60 to be displayed on dial 72.

While the particular inspection devices and method shown herein and described in detail are fully capable of attaining the objects and providing the advantages hereinbefore stated, it is to be understood that they are merely illustrative of the presently preferred embodiments of the invention.

It will be obvious to those skilled in the art that changes and modifications may be made without departing from this invention in its broader aspects. For example, limit switches may be activated by transducer 59 to stop the motors 22, 26 or 30 when the probing element 14 is deflected more than a predetermined amount indicating that the machine is over-traveling part A. This will, of course, prevent damage to the probing element 14. Then, should the limit switches fail, the spindle 46 will snap at its reduced neck port 48 thereby minimizing damage to probing element 14.

Therefore, the aim in the appended claims is to cover all such changes and modifications as fall within the true spirit and scope of this invention.

What is claimed is:

1. A probing element for inspection device comprising: an elongated hollow body having a seat mounted therein and having an opening extending through the seat and a cylindrical inner wall extending upwardly from the seat, a rockable contact having a spherical tip at one end and a hemispherical member at a second end with the tip and the hemispherical member being interconnected by a spindle, the contact hemispherical member having a flat upper face, the contact spindle having a weakened section for purposes of preventing destruction of the probing element in the event a force is subjected to the contact at the spherical tip, the contact hemispherical member extending within the hollow body and engaging the seat such that the contact can be rocked relative to the body and the contact spindle extending through the body opening, an elongated hollow piston having a pair of spaced-apart annular shoulders extending therefrom with the piston being slideably mounted within the hollow body and the piston shoulders engaging the body inner cylindrical wall for purposes of guiding the piston for movement within the hollow body, the piston having a lower flat face mating with and engaging the contact flat upper face whereby rocking movement of the contact is transmitted to the piston which will move linearly within the hollow body, a spring being mounted within the hollow body engaging and urging the piston against the contact hemispherical member, and a linear displacement transducer being disposed within the hollow body and including a movable extremity extending within and engaging the piston whereby movement of the contact spherical tip will be transmitted through the piston causing movement of the transducer extremity to generate a signal from the transducer.

2. A numerically controlled machine having an arbor and in combination with a probing element as defined in claim 1 comprising:

a movable table for supporting a part to be inspected and including a means for driving the table, the probing element being mounted on the machine arbor with the probing element spherical tip engaging the part on the movable table, a programmed inspection tape means being coupled with the table drive means for controlling the movement of the table along a predetermined path, and a recorder being coupled to the transducer of the probing element for indicating variations in the part as the table controlling means moves the table and the part past the probing element.

References Cited by the Examiner

UNITED STATES PATENTS

| | | | |
|---|---|---|---|
| 2,090,178 | 8/1937 | Brickner | 33—169 |
| 2,545,881 | 3/1951 | Graham | 33—172 |
| 2,595,460 | 5/1952 | Jabour | 33—174 |
| 2,835,042 | 5/1958 | Tandler | 33—174 |

ISAAC LISANN, Primary Examiner.

LEONARD FORMAN, Examiner.